(12) United States Patent
Medina Acosta et al.

(10) Patent No.: US 11,140,635 B2
(45) Date of Patent: Oct. 5, 2021

(54) METHODS AND SYSTEMS FOR UPLINK POWER ALLOCATION TECHNIQUES IN MULTICARRIER SCENARIOS

(71) Applicant: TELEFONAKTIEBOLAGET LM ERICSSON (PUBL), Stockholm (SE)

(72) Inventors: Gerardo Agni Medina Acosta, Märsta (SE); Erik Larsson, Uppsala (SE); Billy Hogan, Sollentuna (SE); Nianshan Shi, Järfälla (SE); Andreas Andersson, Landvetter (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 678 days.

(21) Appl. No.: 15/306,248

(22) PCT Filed: Sep. 29, 2016

(86) PCT No.: PCT/IB2016/055842
§ 371 (c)(1),
(2) Date: Oct. 24, 2016

(87) PCT Pub. No.: WO2017/056040
PCT Pub. Date: Apr. 6, 2017

(65) Prior Publication Data
US 2017/0273028 A1    Sep. 21, 2017

Related U.S. Application Data

(60) Provisional application No. 62/236,236, filed on Oct. 2, 2015.

(51) Int. Cl.
*H04W 52/14* (2009.01)
*H04W 76/27* (2018.01)
(Continued)

(52) U.S. Cl.
CPC ....... *H04W 52/146* (2013.01); *H04W 52/241* (2013.01); *H04W 52/34* (2013.01);
(Continued)

(58) Field of Classification Search
CPC ........ H04B 7/04; H04B 7/061; H04B 7/0621; H04B 7/0634; H04B 7/068; H04B 7/0691;
(Continued)

(56) References Cited

U.S. PATENT DOCUMENTS

2007/0070908 A1* 3/2007 Ghosh ................ H04W 28/18
370/236
2008/0279142 A1* 11/2008 Kim .................... H04W 52/42
370/329
(Continued)

FOREIGN PATENT DOCUMENTS

| CN | 101971549 A | 2/2011 |
| CN | 102076072 A | 5/2011 |

(Continued)

OTHER PUBLICATIONS

Qualcomm Europe: "Remaining issues in E-TFC Selection in DC-HSUPA," 3GPP draft; R2-095957; 3rd Generation Partnership Project; Oct. 16, 2009.
(Continued)

*Primary Examiner* — Yuwen Pan
*Assistant Examiner* — Paul P Tran

(57) ABSTRACT

Systems and methods for controlling uplink (UL) power allocation in a user equipment (UE) operating in a communication network are provided. The method includes: selecting between at least a first UL power allocation technique and a second power allocation technique for use in the UE; and using the selected power allocation technique in the UE
(Continued)

to transmit uplink data by allocating transmit power between at least two carriers on which the uplink data is transmitted.

20 Claims, 5 Drawing Sheets

(51) Int. Cl.
*H04W 52/24* (2009.01)
*H04W 52/34* (2009.01)
*H04W 72/04* (2009.01)
*H04W 72/14* (2009.01)
*H04W 88/02* (2009.01)

(52) U.S. Cl.
CPC ... *H04W 72/0453* (2013.01); *H04W 72/0473* (2013.01); *H04W 72/14* (2013.01); *H04W 76/27* (2018.02); *H04W 88/02* (2013.01)

(58) Field of Classification Search
CPC ..... H04L 1/1812; H04L 5/0007; H04L 5/001; H04L 5/0016; H04L 5/0053; H04L 5/0092; H04L 27/18; H04W 42/146; H04W 42/241; H04W 42/34; H04W 52/04; H04W 52/143; H04W 52/146; H04W 52/18; H04W 52/241; H04W 52/281; H04W 52/286; H04W 52/325; H04W 52/346; H04W 52/34; H04W 52/365; H04W 52/367; H04W 52/48; H04W 52/54; H04W 72/0375; H04W 72/0406; H04W 72/0413; H04W 72/0446; H04W 72/0453; H04W 72/0473; H04W 72/048; H04W 72/0486; H04W 72/04; H04W 72/1242; H04W 72/1284; H04W 72/14; H04W 76/046; H04W 88/02
See application file for complete search history.

(56) References Cited

U.S. PATENT DOCUMENTS

| | | | | |
|---|---|---|---|---|
| 2008/0280638 | A1* | 11/2008 | Malladi | H04W 52/08 455/522 |
| 2010/0111023 | A1* | 5/2010 | Pelletier | H04L 5/0007 370/329 |
| 2010/0113004 | A1* | 5/2010 | Cave | H04W 52/365 455/422.1 |
| 2010/0157895 | A1* | 6/2010 | Pani | H04L 5/0044 370/328 |
| 2010/0202392 | A1 | 8/2010 | Zhang | |
| 2010/0202394 | A1* | 8/2010 | Zhang | H04W 52/48 370/329 |
| 2011/0075594 | A1* | 3/2011 | Burstrom | H04W 52/146 370/280 |
| 2011/0207415 | A1* | 8/2011 | Luo | H04W 52/42 455/68 |
| 2012/0008563 | A1 | 1/2012 | Johansson | |
| 2017/0013565 | A1* | 1/2017 | Pelletier | H04W 52/146 |

FOREIGN PATENT DOCUMENTS

| | | |
|---|---|---|
| CN | 102282896 A | 12/2011 |
| WO | 2007066907 A1 | 6/2007 |
| WO | 2015116866 A1 | 8/2015 |

OTHER PUBLICATIONS

Qualcomm Europe: "E-TFC Selection in DC-HSUPA—The Last Open Issues," 3GPP draft; R2-096838; 3rd Generation Partnership Project; Nov. 1, 2009.

Qualcomm Incorporated, Considerations on DB-DC-HSUPA power and data allocation rules, R1-156063, 3GPP TSG RAN WG1 Meeting #82bis, Malmo, Sweden, Oct. 5-9, 2015.

ETSI MCC, Draft Report of 3GPP TSG RAN WG2 meeting #91 Beijing, China, Aug. 24-28, 2015, R2-154002, 3GPP TSG-RAN Working Group 2 meeting #92bis, Malmo, Sweden, Oct. 5-9, 2015.

* cited by examiner

METHODS AND SYSTEMS FOR UPLINK POWER ALLOCATION TECHNIQUES IN MULTICARRIER SCENARIOS

RELATED APPLICATION

This application is related to, and claims priority from, U.S. Provisional Patent Application No. 62/236,236, filed on Oct. 2, 2015, entitled "On a Network Controlled UL Power Allocation Algorithm in Multicarrier Scenarios", the disclosure of which is incorporated here by reference.

TECHNICAL FIELD

The present invention generally relates to power allocation and, more specifically, to uplink power allocation in user equipments.

BACKGROUND

Spectrum is a fundamental and valuable resource for enabling successful mobile broadband (MBB) usage. User experience can be significantly improved by increasing the bandwidth that is available to a user, especially in bandwidth limited scenarios. For wide band code division multiple access (WCDMA) systems, increasing the user bandwidth could, in principle, be achieved by redefining the underlying WCDMA structure to operate with a higher chip rate and bandwidth. Such an approach would require a contiguous spectrum, which is not always available, nor would this approach be compatible with legacy user equipments (UEs).

An alternative approach is therefore to keep the concept of 5 MHz WCDMA carriers that can be accessed by all UEs while also enabling new UEs to transmit and receive on multiple carriers simultaneously. This is the basis of the multi-carrier high speed packet access (HSPA) evolution. Multi-carrier support has been introduced into HSPA specifications over several releases and currently supports up to eight downlink carriers and up to two uplink carriers. While downlink carriers are allowed to be non-contiguous (multi-band operation), the uplink carriers need to be adjacent (single-band operation). HSPA uplink multicarrier, referred to as dual-cell (DC) HSUPA, was introduced in Rel-9 of the Third Generation Partnership Project (3GPP) specifications.

Single-band operation in the uplink typically allows for the use of one power amplifier (PA) for both carriers, which makes the implementation simpler and cheaper. However, dual-band capability is attractive to operators that use a fragmented spectrum. Dual-band may become even more useful in the future due to spectrum re-farming to other technologies, e.g., long term evolution (LTE). A typical operator may have one carrier in a low band, e.g., U900, and one or two carriers in a high-band, e.g., U2100. Hence being able to efficiently operate two carriers in different bands is expected to be useful for providing a successful MBB experience for HSPA in the future.

A 3GPP work item with the title 'HSPA Dual-Band UL carrier aggregation' was agreed to in December 2014, with the object being to introduce support for dual-band dual-cell HSUPA (DB-DC-HSUPA) operation in 3GPP release 13. Most of the core specifications for multi-carrier HSPA are agnostic to the frequency bands and carriers for which multiple cells are configured. However, radio frequency (RF) conformance requirements need to be updated with values specifically relevant to each combination. For uplink multicarrier implementation there are also radio resource management (RRM) impacts and changes that need to be addressed. For example, uplink (UL) transmission (Tx) power allocation and enhanced dedicated channel transport format combination (E-TFC) selection are not currently optimal for dual-band operation.

Thus, there is a need to provide methods and systems that overcome the above-described drawbacks of the conventional approaches to uplink power allocation techniques in multi-carrier scenarios.

SUMMARY

Embodiments allow for implementing different uplink power allocation techniques for wireless devices which use dual-band dual-cell high speed uplink packet access (DB-DC-HSUPA) to improve power usage as compared to conventional techniques.

According to an embodiment, there is a method for controlling uplink (UL) power allocation in a user equipment (UE) operating in a communication network, the method including: selecting between at least a first UL power allocation technique and a second power allocation technique for use in the UE; and using the selected power allocation technique in the UE to transmit uplink data by allocating transmit power between at least two carriers on which the uplink data is transmitted.

According to an embodiment, there is a user equipment (UE) in a communication network in which uplink (UL) power allocation is controlled, the UE including: a processor configured to select between at least a first UL power allocation technique and a second UL power allocation technique for use in the UE; and the processor configured to use the selected UL power allocation technique in the UE to transmit uplink data by allocating transmit power between at least two carriers on which the uplink data is transmitted.

According to an embodiment, there is an apparatus adapted to control uplink (UL) power allocation in a user equipment (UE) operating in a communication network by selecting between at least a first UL power allocation technique and a second power allocation technique for use in the UE; and using the selected power allocation technique in the UE to transmit uplink data by allocating transmit power between at least two carriers on which the uplink data is transmitted.

According to an embodiment, there is an apparatus comprising: a first module configured to select between at least a first UL power allocation technique and a second power allocation technique for use in the UE; and a second module configured to use the selected power allocation technique in the UE to transmit uplink data by allocating transmit power between at least two carriers on which the uplink data is transmitted.

According to an embodiment, there is a non-transitory computer readable medium which, when executed by a processor, performs the following steps: selecting between at least a first UL power allocation technique and a second power allocation technique for use in the UE; and using the selected power allocation technique in the UE to transmit uplink data by allocating transmit power between at least two carriers on which the uplink data is transmitted.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background, there are problems associated with the conventional approaches of uplink power allocation techniques in multi-carrier scenarios. According to an embodiment, those problems are addressed by implementing various power allocation techniques.

Figure 1:
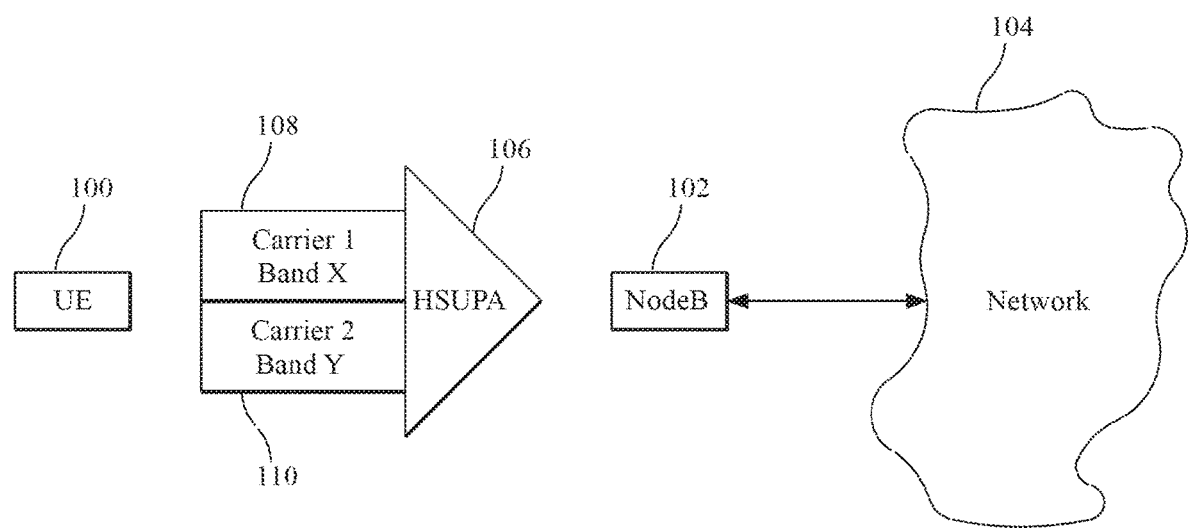
FIG. 1 illustrates dual-band dual-cell high speed uplink packet access (DB-DC-HSUPA) according to an embodiment.

FIG. 1 illustrates a dual-band dual-cell high speed uplink packet access (DB-DC-HSUPA) for which power allocation techniques described herein can be implemented. In FIG. 1, the user equipment (UE) 100 communicates uplink data to a NodeB 102 which in turn is in communications with a network 104. While a NodeB 102 is shown and described in FIG. 1, it is to be understood that in some networks other types of nodes which perform similar functions to a NodeB could be used, e.g., an eNB or another form of base station, in support of embodiments described herein. The uplink communication from the UE 100 to the NodeB 102 is shown as an HSUPA communication 106 which includes a first carrier 108 using a frequency band X and a second carrier 110 using a second frequency band Y, where the frequency bands X and Y are operating in different frequency ranges. The frequency bands X and Y may be contiguous or non-contiguous. Power allocation techniques are now described beginning with power allocation for a for single-band dual-cell high speed uplink packet access (DC-HSUPA) prior to describing embodiments for dual band in which various power allocation techniques can be used.

Power allocation for single band DC-HSUPA is calculated based on dedicated physical control channel (DPCCH) quality and serving grant for each carrier. More specifically, the power allocation to a frequency i, $P_i$, is calculated as shown in Equation (1):

$$P_i = P_{remaining,s} \frac{P_{DPCCH,target,i} \, SG_i}{\sum_k P_{DPCCH,target,k} \, SG_k}, \quad (1)$$

where $P_{remaining,s}$ is the remaining power for scheduled transmissions once the power for non-scheduled transmissions has been taken into account, $P_{DPCCH,target,i}$ is the filtered DPCCH power as defined in 3$^{rd}$ Generation Partnership Project (3GPP) technical specification (TS) 25.133: "Requirements for support of radio resource management (FDD)," and $SG_i$ is the Serving Grant (SG) on frequency i. This power allocation technique is referred to herein as the "parallel split" power allocation technique.

Hence, it is the quotient between the products of the DPCCH quality and serving grant for the two carriers that will determine the power allocation between the two carriers for single band DC-HSUPA. One implication of this power allocation scheme is that if both carriers have an equal SG, the power is allocated inverse-proportionally to the quality of the carrier, meaning that the carrier with a worse quality (i.e., the highest DPCCH power) is prioritized and given the most power. This might be undesirable, for example, in power limited scenarios with significant power differences between the two DPCCHs, where it evidently would be better to prioritize the carrier with the better quality.

In particular, the parallel split power allocation technique described above with respect to Equation (1) will sometimes be suboptimal for certain dual band scenarios. For example, for a dual-band operation with a low band on, e.g., U900, and a high band on, e.g., U2100, the pathloss difference between different bands can be significant, for example, in the order of 10 dB. In practice what this means is that in most cases for a given UE distance from the Node B, the same number of bits cost less power to send on the low frequency, e.g., U900, carrier than on the high frequency, e.g., U2100, carrier. The parallel split power allocation scheme of Equation (1), which can allocate more of the power to the high frequency carrier, thus can lead to unnecessarily expensive bits in terms of UE transmit power.

To address the problem described above with the existing parallel split power allocation scheme when it is applied to dual band operations, a so-called power sensitive (aka greedy filling) power allocation could be used as an alternative. This power sensitive power allocation is described below with respect to Equation (2).

if $(P_{DPCCH,target,1} < P_{DPCCH,target,2})$ $\{P_1 = \min(P_{DPCCH,target,1} SG_1, P_{remaining,s}),$
$P_2 = P_{remaining,s} - P_1\}$ else $\{P_1 = \min(P_{DPCCH,target,2} SG_2, P_{remaining,s}),$
$P_1 = P_{remaining,s} - P_2\}$ (2)

The aim with this power allocation scheme is to prioritize the best carrier (i.e., the carrier with lowest DPCCH power). Power is allocated in a sequential manner, where the best carrier is first allocated power up to what the serving grant allows, and then any remaining power is given to the secondary carrier taking the serving grant into consideration.

Figure 2:
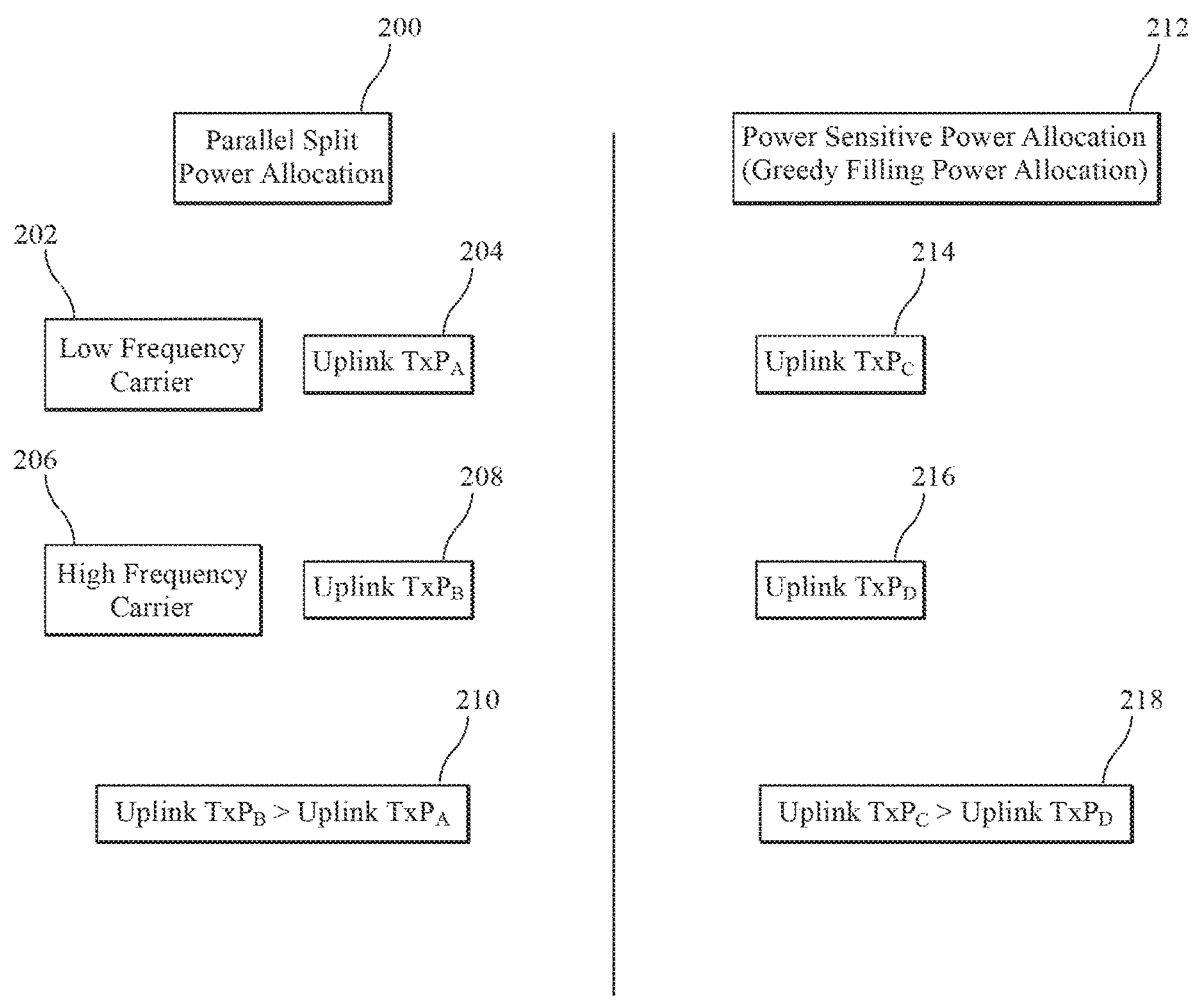
FIG. 2 illustrates the parallel split power allocation and the power sensitive power allocation technique with respect to transmission power over different carriers and bands according to an embodiment

According to an embodiment, FIG. 2 illustrates some of the effects of the parallel split power allocation and the power sensitive (or greedy filling) power allocation scheme with respect to transmission power when operating in a dual-band dual-cell mode on the UE 100. In FIG. 2, a UE using the parallel split power allocation scheme 200 can transmit on a low frequency carrier 202 using a power amount represented by Uplink $T_xP_A$ 204 and can transmit on a high frequency carrier 206 using a power amount represented by Uplink $T_xP_B$ 208. For the parallel split power allocation technique 200, the Uplink $T_xP_B$ can be greater than Uplink $T_xP_A$ as shown in block 210 for the reasons mentioned previously. A UE using the power sensitive power allocation technique 212 can transmit on a low frequency carrier 202 using a power amount represented by Uplink $T_xP_C$ 214 and can transmit on a high frequency carrier 206 using a power represented by Uplink $T_xP_D$ 216. For the power sensitive power allocation technique 212, the Uplink $T_xP_C$ can be greater than Uplink $T_xP_D$ as shown in block 218. Thus, depending upon the size of the frequency gap between the high frequency carrier 206 and the low frequency carrier 202, the power sensitive technique will potentially more efficiently allocate power to the bits being transmitted.

While power efficiency is important, another aspect for efficient system operation is proper load balancing. That is, the network needs to ensure that traffic is distributed in an appropriate way across all available carriers (both for multi-carrier capable and non-multi-carrier capable UEs). However, the power sensitive power allocation 200 scheme prioritizes the best carrier and might therefore force a majority of the traffic to the best carrier, which might lead to less than desirable load balancing. In the parallel split power technique, the network can achieve efficient load balancing by letting different groups of UEs have different carriers as their primary carrier, and proper grant scheduling.

Thus both the parallel split power allocation technique 200 and the power sensitive power allocation technique 212 have their strengths and weaknesses. Therefore, according to some of the embodiments described herein, a UE can be configured to use either of the two (or more) different power allocation techniques. This means that a decision has to be made, e.g., either by the UE or by the network regarding which of the power allocations to use for any given transmission. On the one hand, the UE has better knowledge than the network about the power situation (i.e., available remaining power) at the UE side and can therefore, in general, make faster and better decisions. On the other hand, the network is the node aware of the overall network load situation and is therefore best suited for handling the load balancing. Thus, according to various embodiments, for load balancing and power allocation technique selection, various combinations of nodes (e.g., the network, NodeB and the UE) can have various contributions to the power allocation technique selection mechanism.

Figure 3:
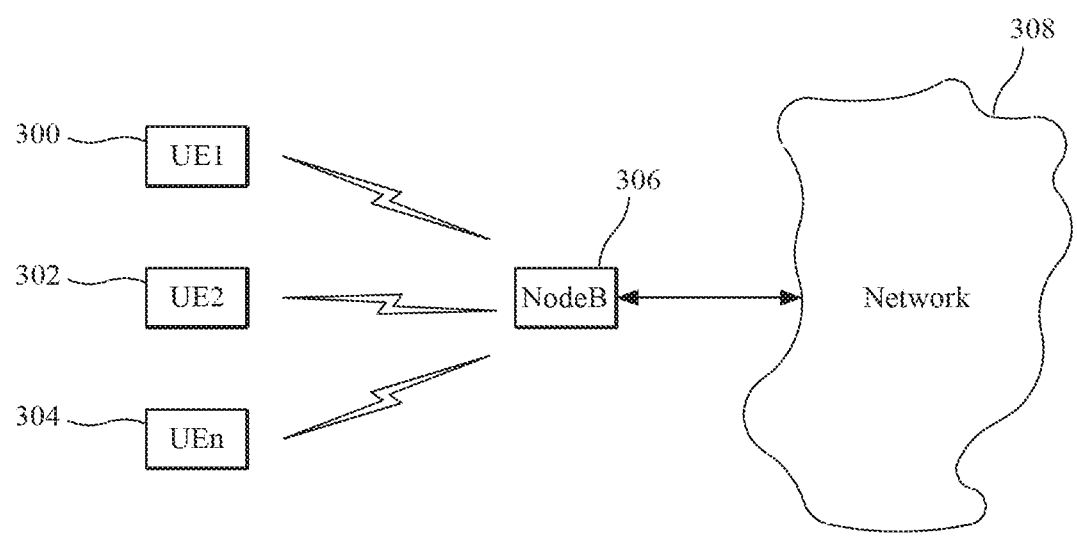
FIG. 3 shows a plurality of user equipments (UEs) implementing different power allocation techniques according to an embodiment.

According to an embodiment, disclosed herein is a framework that encompasses both the legacy parallel split power technique and the power sensitive (greedy filling) power allocation technique with network controlled operation. This enables the following; (1) having the ability to choose between the parallel and the greedy filling (GF) techniques; and (2) when the network uses the GF, having the ability to limit the application of GF to a subset of UEs—such as those power limited UEs that would benefit most from GF. An example of this can be seen in FIG. 3, in which there is a plurality of UEs (UE1 300, UE2 302 . . . UEn 304) which are in communication with an NodeB 306 which, in turn, is in communication with a network 308. A subset of the UEs, e.g., UE1 300 and UE2 302, can be the subset of UEs that would benefit, in this example, from using the GF power allocation technique, whereas another UE, e.g., UEn 304, may benefit from using the parallel split power allocation technique.

According to an embodiment, the UE does hypothesis testing to maximize a certain criterion, e.g., total throughput, as a mechanism for selecting which power allocation technique to apply to its pending transmission. In this hypothesis testing procedure, the UE performs two different power allocation and E-TFC selection calculations, one per power allocation scheme, and then chooses the alternative that maximizes the criterion function. E-TFC selection is described in more detail below. If additional network control is desired, additional constraints can be added that restrict which hypotheses are allowed. For example, additional constraints can be configured that would force the UE to use one or the other of the two power allocation techniques. Examples include, but are not restricted to: (1) a network configured parameter that indicates whether the parallel power allocation technique, the GF power allocation technique, or both techniques should be used in the E-TFC selection procedure; and (2) the choice of which techniques to include in the hypothesis testing can more generally be a function of one or several input parameters. Specific embodiments illustrating the use of such parameters are described below.

Some examples of these input parameters include, but are not limited to: (1) a function of the difference in DPCCH power level for the two carriers; (2) if the difference is large enough (above a threshold), then use the GF, otherwise use the parallel split power technique; (3) and/or a function of absolute DPCCH power level for one or both carriers; and/or a function of difference in SG between the carriers; (4) and/or a function of absolute SGs for the two carriers; (5) and/or a function of power status at the UE side (e.g., GF when power limited); (6) and/or a function of measured downlink quality for the downlink (DL) carriers corresponding to the uplink (UL) carriers. For example, if the long term common pilot channel (CPICH) quality (signal-to-noise ratio (SNR) or signal-to-interference-and-noise ratio (SINR)) is significantly better for one of the carriers, then the UE can apply the GF technique and otherwise the UE can apply the parallel split power technique.

According to an embodiment, the SG can be a factor for determining which power allocation technique to use. For example, when the UE is operating in DB-DC-HSUPA mode, and the secondary carrier is Activated, then if the serving grant on the low band carrier (e.g., U900) $SG_l$ is below a threshold α then the UE shall use the greedy filling technique, otherwise the UE uses the parallel split power technique. Different alternatives for implementing this scheme in the UE can be envisioned. For example, when the UE is using DB-DC-HSUPA and the secondary carrier is Activated the following logic can be implemented in the UE to select a power allocation scheme.

IF $SG_l$<α then
UE uses GF
ELSE
UE uses Parallel Split
ENDIF

According to an embodiment, the threshold α can be hardcoded into the specifications, be a dynamic L1 parameter, a semi-static radio resource control (RRC), or a Node B application part (NBAP)/radio network subsystem application part (RNSAP) parameter. If signaled to the UE by the network, then a represents an example of the constraints or parameters mentioned above by way of which the network can influence the UE's selection of the power allocation technique. Additionally, this approach provides the network with the choice to force the UE to always use the GF technique by setting α to a very large value, based on, for example, the SG value, and to always use the parallel split power technique by setting α=0.

According to an embodiment, the amount of power available can also be a factor for determining the choice of power allocation technique to be used for UEs. For example, when a UE is operating in DB-DC-HSUPA mode, and the secondary carrier is Activated then if serving grant on the low band carrier (e.g., U900) $SG_l$ is below a threshold α and the UE is power limited, then the UE shall use the greedy filling algorithm, otherwise use the parallel split power technique.

Uplink power limited can be defined in different ways. One example could be that the UE, even when transmitting at its maximum allowed power using the parallel power split technique, does not have enough remaining power to be able to transmit all E-TFCs accordingly to one or both of the serving grants on each carrier. In other words, certain E-TFCs are restricted (as defined by 3GPP 25.133) on one or both carriers. Such a power limitation might occur regardless of whether the UE uses a single PA or a dual PA architecture. In the current specification 25.133 the Maximum UE transmitter power is defined as follows as shown in Equation (3):

$$\text{Maximum UE transmitter power} = \text{MIN} \{\text{Maximum allowed UL TX Power}, P\text{ MAX}\} \quad (3)$$

where Maximum allowed UL TX Power is set by Universal Terrestrial Radio Access Network (UTRAN) and defined in 3GPP TS 25.331: "RRC Protocol Specification," and PMAX is the UE nominal maximum transmit power as defined by the UE power class, and specified in table 6.1 of 3GPP TS 25.101: "UE Radio transmission and reception (FDD)."

Different alternatives for implementing this technique in the UE can be implemented. For example, when the UE is using DB-DC-HSUPA and the secondary carrier is Activated the following can be implemented.
IF $SG_l$<α AND the UE is uplink power limited then
UE uses GF
ELSE
UE uses Parallel Split
ENDIF According to an embodiment, the threshold α can be hardcoded into the specifications, be a dynamic L1 parameter, or a semi-static RRC, NBAP/RNSAP parameter. This approach provides the network with the choice to force the UE to always use GF when it is uplink power limited by setting α to a very large value and to always use parallel split power technique by setting α=0.

Note that a UE that is power limited when trying to apply the parallel split power technique may still be power limited when it applies the GF power technique. However, according to an embodiment, in a power limited scenario where one carrier is much cheaper than the other in terms of power (i.e., less DPCCH power required for one of the carriers), the GF scheme will be more efficient in terms of the amount of bits sent.

According to embodiments, the methods described above for selecting a power allocation technique can be controlled in different ways. More specifically, how to set parameters to control selection of the techniques and how to handle communications between the UE(s) and the network can be done differently. Some examples are now described.

As described above, parameters for controlling the operation of this approach can be hardcoded into the spec, be a dynamic L1 parameter, a semi-static RRC, a NBAP/RNSAP parameter, or a combination thereof. For example, the network may indicate to the UE via RRC signalling and the Node B via NBAP signalling to apply either the parallel split power allocation technique or the greedy filling power allocation technique during setting up or reconfiguration. Also, the network can dynamically change the value of certain parameters by means of L1 orders (e.g., shared control channel for HS-DSCH (HS-SCCH) orders). According to another embodiment, the UE autonomously decides how to set certain parameters, e.g., whether to use the GF technique or the parallel split power technique.

According to another embodiment, the UE may indicate to the network, e.g., via RRC or mobility control information (MCI) that certain criteria used to select a different power allocation scheme were reached and thus request the network to change some of the parameters, for example, to change the power allocation technique. If autonomous UE decisions are allowed, it could be beneficial for the UE to dynamically notify the network about its actions. For example, there could be a L1 indication sent from the UE to the network regarding whether the GF or the parallel split algorithm is employed. Even if dynamic L1 signaling is deemed too costly or complex, the UE can still indicate to the network, e.g., via RRC or MCI, the power scheme currently in use to provide awareness of the technique to the network. If this kind of semi-dynamic signaling is used, it may be useful to impose some restrictions on how often the UE is allowed to change power selection techniques to avoid ping-pong effects. Hence, changing the power technique too often may, in some scenarios, be undesirable.

Along with selection of a power allocation technique, embodiments also consider data allocation. The enhanced dedicated channel transport format combination (E-TFC) selection procedure consists of power allocation (described above) and data allocation. The current DC-HSUPA data allocation scheme is sequential starting from the secondary carrier. That is, given the result of the power allocation scheme, data is first allocated to the secondary carrier and thereafter to the primary carrier. According to an embodiment, since the power sensitive scheme or greedy filling technique prioritizes the best carrier, it can be useful when using that power allocation technique to change the data allocation scheme and first allocate data to the best carrier and thereafter to the remaining carrier. Furthermore, in the current DC-HSUPA scheme, non-scheduled data is always transmitted on the primary carrier. According to an embodiment, when the power sensitive scheme is selected for a UE transmission, the data allocation scheme can be changed to always map non-scheduled data to the best carrier. Alternatively, the UE can decide if retransmission should occur or if a new transmission window for data is to be used.

Changing the E-TFC selection option may create (undesirable) transient behaviors in the system before reaching a 'stable' mode of operation. If the network is in control of operation, then the network can also ensure that changes are done such that a robust and well-behaved network is maintained. If some of the choices are left for the UE to take, it may be useful to impose restrictions on the UE: For example, according to an embodiment, the UE is only allowed to change power selection technique behavior once every x transmission time interval (TTI), or within a restricted periodic time period, where x is an integer. Other selection behavior can also be used as desired.

Changing the E-TFC selection technique may also affect other components in the E-TFC selection procedure, e.g., retransmissions. According to an embodiment, retransmissions could be handled as in the current spec (3GPP TS 25.133, 25.321) today, i.e., retransmissions always get priority to be allocated power so when the power splitting is done the same way regardless of when the GF or parallel split power technique is used, see, for example, the reference text produced below in the next paragraph from 3GPP TS 25.133.

Specifically, when the UE has more than one Activated Uplink Frequency and one retransmission is required in one Activated Uplink Frequency, the UE shall estimate the normalized remaining power margin available for E-TFC selection using the power allocated to the Activated Uplink Frequency for which a retransmission is required Pallocated,x and on the power allocated to the Activated Uplink Frequency for which no retransmission is required Pallocated,y defined by Equations (4) and (5).

$$Pallocated,y = P\ \text{Max} - PHS\text{-}DPCCH - \Sigma iPDCCH, target, i - PE\text{-}DPCCH, x - PE\text{-}DPDCH, x \quad (4)$$

$$Pallocated,x = PE\text{-}DPCCH, x + PE\text{-}DPDCH, x \quad (5)$$

According to an embodiment, various optimizations can be envisioned since there might be situations in which the network performance could be improved if the UE 'ignores' a retransmission and prioritizes according to the currently employed power allocation scheme. For example, it may be desirable to ignore a retransmission if it becomes significantly more expensive (in terms of power) to send the retransmission on the lower quality carrier than sending new data on the best carrier, or if the UE has become power limited and has significantly too little power to accommodate the retransmission on the worse carrier (in which case it is expected that the retransmission will trigger yet another retransmission).

Most of the embodiments disclosed herein can be generalized to apply to more than two power allocation techniques. The embodiments described above can also be combined in different ways.

Embodiments addressed herein are described in the context of DB-DC-HSUPA, where significantly different pathloss characteristics between the two carriers can occur (e.g., the U900 and U2100 bands). However, according to embodiments, the solutions can equally well be applied to the DC-HSUPA case (i.e., when both carriers are in the same frequency band). There might be significant differences in quality between the two carriers even though they are in the same frequency band. For example, one of the antennas or PA (if different PAs are used for the different carriers) may be much worse than the other (by construction or obstruction), and shadowing or small-scale fading can be different for the two carriers. These effects can be rather static or more dynamic.

Figure 4:
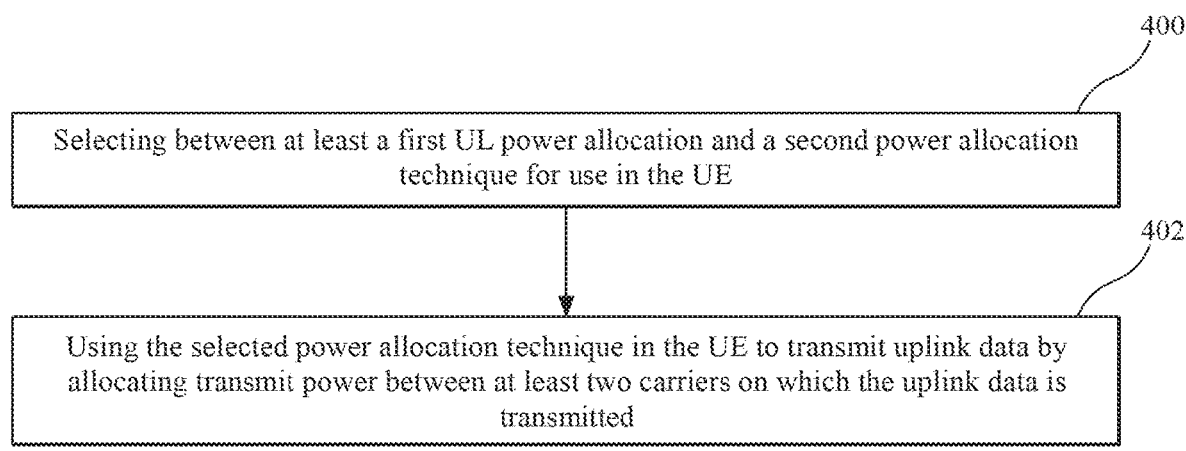
FIG. 4 illustrates a flowchart of a method for uplink power allocation according to an embodiment.

The embodiments can also be generalized, for example as shown in the embodiment of FIG. 4. According to an embodiment, there is a method for controlling uplink (UL) power allocation in a user equipment (UE) operating in a communication network. The method includes: at step 400, selecting between at least a first UL power allocation technique and a second power allocation technique for use in the UE; and at step 402, using the selected power allocation technique in the UE to transmit uplink data by allocating transmit power between at least two carriers on which the uplink data is transmitted.

Figure 5:
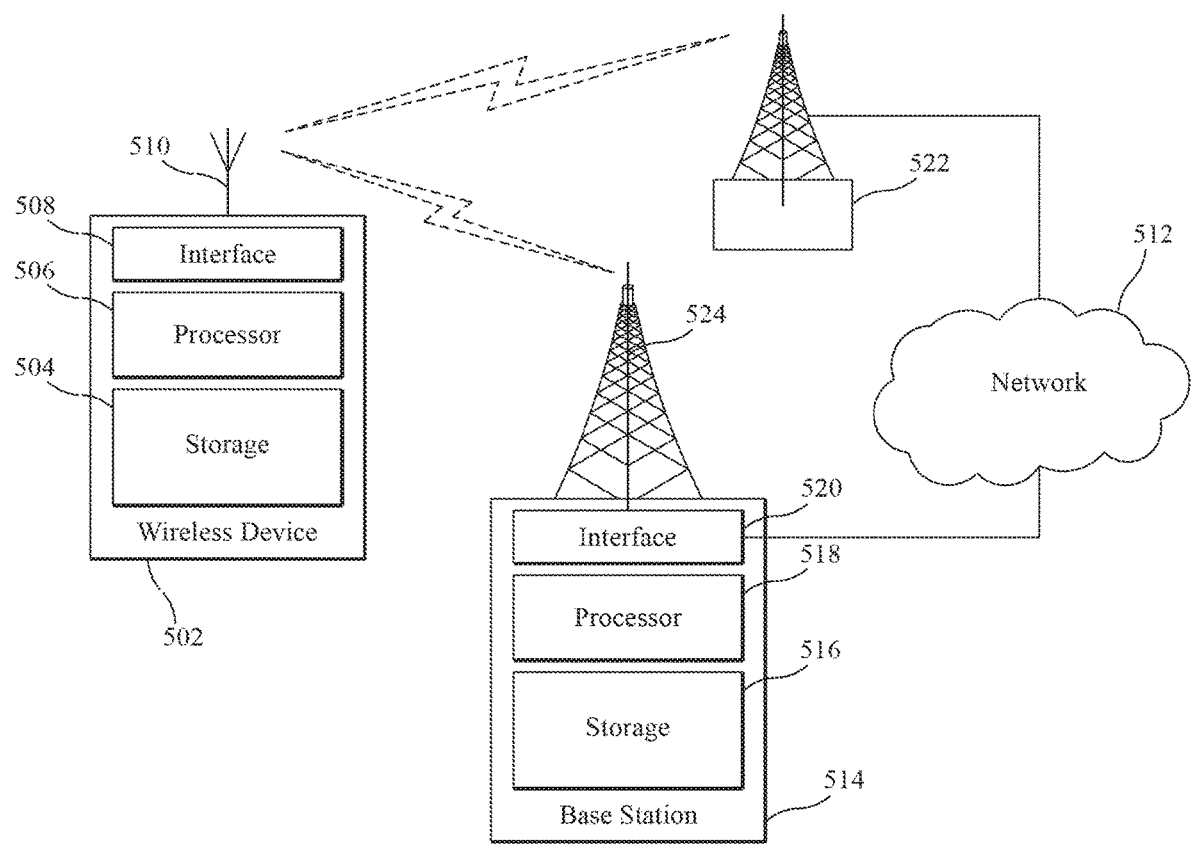
FIG. 5 illustrates a wireless device, network nodes and a network associated with implementing uplink power allocation techniques according to an embodiment.

FIG. 5 illustrates a wireless network comprising a more detailed view of a network 512, a network node 514, e.g., a NodeB or a base station, and a wireless device 502, e.g., a UE, in which the various embodiments described above can be implemented. For simplicity, FIG. 5 only depicts network 512, network nodes 514 and 522, and the wireless device 502. Network node 514 includes a processor 516, storage 518, e.g., a memory, a communications interface 520, and antenna 524. Similarly, the wireless device 502 includes a processor 506, storage 504, e.g., a memory, a communications interface 508 and an antenna 510. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections in support of embodiments described herein associated with uplink power allocation techniques.

The network 512 may include one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

As described above, the network node 514 includes a processor 516, storage 518, a communications interface 520, and antenna 524. These components are depicted as single boxes located within a single larger box. In practice however, a network node may comprise multiple different physical components that make up a single illustrated component (e.g., communication interface 520 may include terminals for coupling wires for a wired connection and a radio transceiver for a wireless connection). As another example, network node 514 may be a virtual network node in which multiple different, physically separate components interact to provide the functionality of network node 515 (e.g., processor 502 may include three separate processors located in three separate enclosures, where each processor is responsible for a different function for a particular instance of network node 514).

According to an embodiment, network node 514 may be composed of multiple physically separate components (e.g., a NodeB component and a radio network controller (RNC) component, a base transceiver station (BTS) component and a base station controller (BSC) component, etc.), which may each have their own respective processor, storage, and interface components. In certain scenarios in which network node 514 includes multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 514 may be configured to support multiple radio access technologies (RATs). In such embodiments, some components may be duplicated (e.g., separate storage 516 for the different RATs) and some components may be reused (e.g., the same antenna 524 may be shared by the RATs).

Processor 518 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 514 components, such as storage 516, network node 514 functionality. For example, processor 518 may execute instructions stored in storage 516. Such functionality may include providing various wireless features discussed herein to wireless devices, such as wireless device 502, including any of the features or benefits disclosed herein.

Storage 516 may include any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 518 may also store any suitable instructions, data or information, including software and encoded logic, utilized by network node 514. Storage 516 may be used to store any calculations made by processor 518 and/or any data received via interface 520.

Network node 514 also includes interface 520 which may be used in the wired or wireless communication of signaling and/or data between network node 514, network 512, and/or wireless device 502. For example, interface 520 may perform any formatting, coding, or translating that may be needed to allow network node 514 to send and receive data from network 512 over a wired connection. Interface 520 may also include a radio transmitter and/or receiver that may be coupled to or a part of antenna 524. The radio may receive digital data that is to be sent out to other network nodes or wireless devices via a wireless connection. The radio may convert the digital data into a radio signal having the appropriate channel and bandwidth parameters. The radio signal may then be transmitted via antenna 524 to the appropriate recipient (e.g., wireless device 502).

Antenna 524 may be any type of antenna capable of transmitting and receiving data and/or signals wirelessly. In some embodiments, antenna 524 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 502 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network nodes 514 and 522 and/or other wireless devices 502. Wireless device 502 includes a processor 506, storage 504, e.g., memory, a communications interface 508, and an antenna 510. Like network node 514, the components of the wireless device 502 are depicted as single boxes located within a single larger box, however in practice a wireless device may comprises multiple different physical components that make up a single illustrated component (e.g., storage 504 may comprise multiple discrete microchips, each microchip representing a portion of the total storage capacity).

Processor 506 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 502 components, such as storage 504, wireless device 502 functionality. Such functionality may include providing various wireless features discussed herein, including any of the features or benefits disclosed herein.

Storage 504 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 504 may store any suitable data, instructions, or information, including software and encoded logic, utilized by wireless device 502. Storage 504 may be used to store any calculations made by processor 506 and/or any data received via interface 508.

Interface 508 may be used in the wireless communication of signaling and/or data between wireless device 502 and network nodes 514 and 522. For example, interface 508 may perform any formatting, coding, or translating that may be needed to allow wireless device 502 to send and receive data from network node 514 over a wireless connection. Interface 508 may also include a radio transmitter and/or receiver that may be coupled to or a part of antenna 510. The radio may receive digital data that is to be sent out to network node 514 via a wireless connection. The radio may convert the digital data into a radio signal having the appropriate channel and bandwidth parameters. The radio signal may then be transmitted via antenna 510 to network node 514.

Antenna 510 may be any type of antenna capable of transmitting and receiving data and/or signals wirelessly. In some embodiments, antenna 510 may comprise one or more omni-directional, sector or panel antennas operable to transmit/receive radio signals between 2 GHz and 66 GHz. For simplicity, antenna 510 may be considered a part of interface 508 to the extent that a wireless signal is being used.

Embodiments allow for the combination of the parallel split power allocation technique, E-TFC selection scheme and the power sensitive power allocation technique for DB-DC-HSUPA operation. This provides network control of when to operate one or the other scheme and to facilitate a flexible migration path for implementing DB-DC-HSUPA. Additionally, embodiments allow for the use of different power allocation techniques which best suit the UE power, while allowing the network to provide control to achieve load balancing.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein. The disclosed embodiments provide methods and devices selecting and using a desired uplink power allocation technique. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments, e.g., implementing the desired uplink power allocation technique, can be implemented using a computer program product stored on a computer-readable storage medium having computer-readable instructions embodied in the medium. Any suitable computer-readable medium may be utilized, including RAM, hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for controlling uplink (UL) power allocation in a user equipment (UE) operating in a communication network, the method comprising:
    selecting between at least a first UL power allocation technique and a second power allocation technique for use in the UE, wherein the choice of the UL power allocation technique to select is received from the communication network; and
    using the selected power allocation technique in the UE to transmit uplink data by allocating transmit power between at least two carriers on which the uplink data is transmitted.

2. The method of claim 1, wherein the first UL power allocation technique is a parallel split power allocation which is determined based on dedicated physical control channel (DPCCH) quality and a serving grant for each carrier.

3. The method of claim 1, wherein the second UL power allocation technique is a power sensitive power allocation scheme in which power is allocated sequentially from best to worst carrier up to a serving grant for each carrier.

4. The method of claim 1, wherein a data allocation scheme is selected based at least in part by the selected UL power allocation technique.

5. The method of claim 1, wherein the selection of the UL power allocation technique occurs at the UE.

6. The method of claim 1, wherein the selection of the UL power allocation technique is based at least in part on at least one of a network configured parameter; a function of a different in dedicated physical control channel (DPCCH) power level between two carriers; a function of absolute DPCCH power level for one or both carriers; a function of a difference in a serving grant between the two carriers; a function of absolute serving grants for the two carriers; a function of a power status at the UE; and a function of measured downlink (DL) quality for DL carriers corresponding to UL carriers.

7. The method of claim 1, wherein when the UE is operating in dual band dual cell high speed uplink packet access (DB-DC-HSUPA) mode and a second carrier is active, the second UL power allocation technique is selected when a serving grant is below a predetermined threshold, otherwise the first UL power allocation technique is selected.

8. The method of claim 7, wherein the predetermined threshold is determined by the network and communicated to the UE via at least one radio resource control (RRC) message.

9. The method of claim 1, wherein when the UE is operating in dual band dual cell high speed uplink packet access (DB-DC-HSUPA) mode and a second carrier is active, the second UL power allocation technique is selected when a serving grant is below a predetermined threshold and the UE is power limited, otherwise the first UL power allocation technique is selected.

10. The method of claim 9, wherein the predetermined threshold is determined by the network and communicated to the UE via at least one radio resource control (RRC) message.

11. A user equipment (UE) in a communication network in which uplink (UL) power allocation is controlled, the UE comprising:
    a processor configured to select between at least a first UL power allocation technique and a second UL power allocation technique for use in the UE wherein the choice of the UL power allocation technique to select is received from the communication network; and
    the processor configured to use the selected UL power allocation technique in the UE to transmit uplink data by allocating transmit power between at least two carriers on which the uplink data is transmitted.

12. The UE of claim 11, wherein the first UL power allocation technique is a parallel split power allocation which is determined based on dedicated physical control channel (DPCCH) quality and a serving grant for each carrier.

13. The UE of claim 11, wherein the second UL power allocation technique is a power sensitive power allocation scheme in which power is allocated sequentially from best to worst carrier up to a serving grant for each carrier.

14. The UE of claim 11, wherein a data allocation scheme is selected based at least in part by the selected UL power allocation technique.

15. The UE of claim 11, wherein the selection of the UL power allocation technique occurs at the UE.

16. The UE of claim 11, wherein the selection of the UL power allocation technique is based at least in part on at least one of a network configured parameter; a function of a different in dedicated physical control channel (DPCCH) power level between two carriers; a function of absolute DPCCH power level for one or both carriers; a function of a difference in a serving grant between the two carriers; a function of absolute serving grants for the two carriers; a function of a power status at the UE; and a function of measured downlink (DL) quality for DL carriers corresponding to UL carriers.

17. The UE of claim 11, wherein when the UE is operating in dual band dual cell high speed uplink packet access (DB-DC-HSUPA) mode and a second carrier is active, the second UL power allocation technique is selected when a serving grant is below a predetermined threshold, otherwise the first UL power allocation technique is selected.

18. The UE of claim 17, wherein the predetermined threshold is determined by the network and communicated to the UE via at least one radio resource control (RRC) message.

19. The UE of claim 11, wherein when the UE is operating in dual band dual cell high speed uplink packet access (DB-DC-HSUPA) mode and a second carrier is active, the second UL power allocation technique is selected when a serving grant is below a predetermined threshold and the UE is power limited, otherwise the first UL power allocation technique is selected.

20. The UE of claim 19, wherein the predetermined threshold is determined by the network and communicated to the UE via at least one radio resource control (RRC) message.

* * * * *